No. 863,812. PATENTED AUG. 20, 1907.
J. A. STONE.
SNAPPING ROLLERS FOR CORN HARVESTERS.
APPLICATION FILED MAR. 22, 1907.
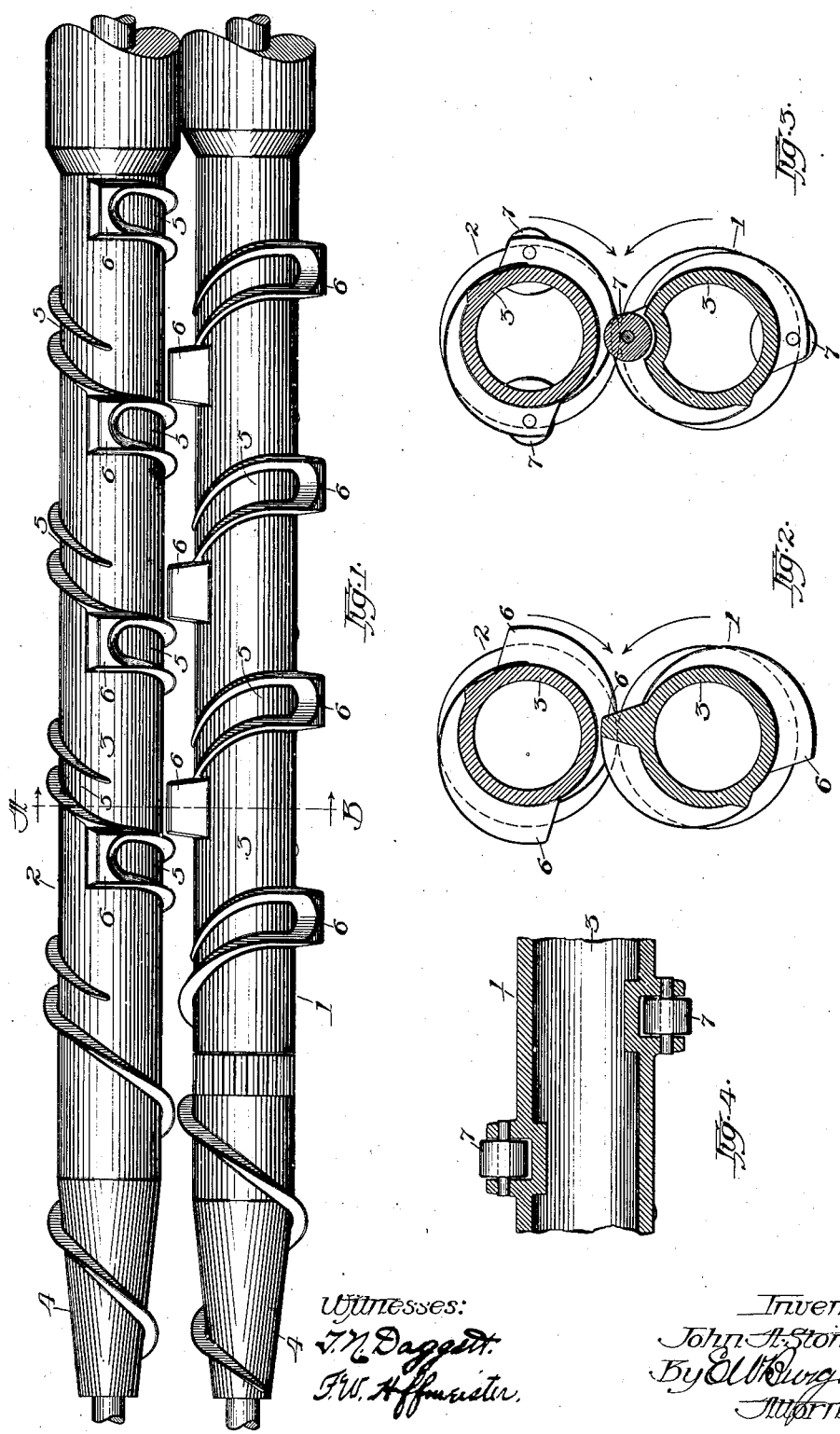
Witnesses:
Inventor
John A. Stone.

UNITED STATES PATENT OFFICE.

JOHN A. STONE, OF CHICAGO, ILLINOIS, ASSIGNOR TO INTERNATIONAL HARVESTER COMPANY, A CORPORATION OF NEW JERSEY.

SNAPPING-ROLLERS FOR CORN-HARVESTERS.

No. 863,812.　　　Specification of Letters Patent.　　　Patented Aug. 20, 1907.

Application filed March 22, 1907. Serial No. 363,817.

*To all whom it may concern:*

Be it known that I, JOHN A. STONE, a citizen of the United States, residing at Chicago, in the county of Cook and State of Illinois, have invented certain new and useful Improvements in Snapping-Rollers for Corn-Harvesters, of which the following is a specification.

My invention relates to snapping rollers designed to gather the ears from the stalks while the latter are uncut and occupying their original position in the field; the stalks being directed to and received between the forward ends of two coacting rollers driven in opposite directions and having spirally arranged ribs thereon adapted to convey the stalks longitudinally relative to the axes of the rollers and toward the rear ends thereof; the object being to provide improved means forming part of the rollers for engaging with the ears and separating them from the stalks as the latter are carried rearward and downward between the coacting rollers, which are preferably mounted in a plane inclined upward and rearward toward the rear end of the machine. I attain this object by the mechanism illustrated in the accompanying drawing, in which—

Figure 1 is a plan view of two coacting snapping rollers embodying my invention. Fig. 2 is a cross section of Fig. 1 on line A—B; and Figs. 3 and 4 represent modified forms of the snapping means.

Similar reference numerals designate like parts throughout the several views.

1 and 2 designate coacting snapping rollers designed to be rotated in opposite directions, having substantially cylindrical body portions 3, and tapered receiving ends 4; and are also provided with two series of spirally arranged ribs that are inclined rearward in a direction opposite to that in which the roller is designed to be rotated in a manner to cause the stalks to move rearward longitudinally relative to the axis of the roller. The ribs are preferably arranged in pairs, the members being in parallel relation and forming narrow intervening channels 5 between the two members, and are gradually increased in height from their forward toward their rear ends, where they terminate in bridge portions 6 that span the intervening channels; the bridges being opposed by the body portion of the coacting roller in their operation of severing the ears from the stalks. Each of said series of pairs of ribs have their forward and terminal ends substantially in line with the axis of the roller and are arranged upon opposite sides of its diameter, and each bridge portion and the series that includes it is substantially in line with the axis of the roller. In Figs. 3 and 4 the bridge portions at the terminals of the pairs of ribs are shown as rollers 7 journaled in the ribs with their axis in line with the axis of the main roller, which construction is equally effective with the fixed bridge at a small reduction of the power required to operate the snapping rollers.

What I claim as my invention, and desire to secure by Letters Patent, is:

1. A snapping-roller for corn-harvesters comprising, in combination, a body portion and a series of pairs of ribs arranged spirally thereon in a manner to move the stalks longitudinally relative to the axis of the roller, each pair of said ribs terminating in a bridge spanning the intervening channel.

2. A snapping-roller for corn-harvesters comprising, in combination, a body portion and a series of pairs of substantially parallel ribs arranged spirally thereon in a manner to move the stalks longitudinally relative to the axis of the roller, each pair of said ribs terminating in a bridge spanning the intervening channels.

3. A snapping-roller for corn-harvesters comprising, in combination, a body portion and a series of pairs of substantially parallel ribs arranged spirally thereon in a manner to move the stalks longitudinally relative to the axis of the roller, and rollers bridging the intervening channel between each pair of said ribs at their terminals.

4. A snapping-roller for corn-harvesters comprising, in combination, a body portion and a series of pairs of substantially parallel ribs arranged spirally thereon in a manner to move the stalks longitudinally relative to the axis of the roller, and rollers bridging the intervening channel between each pair of said ribs and having their axes substantially parallel with the axis of said body portion.

5. A snapping-roller for corn-harvesters comprising, in combination, a body portion and a series of pairs of ribs arranged spirally thereon in a manner to move the stalks longitudinally relative to the axis of the roller, each pair of said ribs terminating in a bridge spanning the intervening channel, the series of bridges being substantially parallel with the axis of the roller.

6. A snapping-roller for corn-harvesters comprising, in combination, a body portion and a plurality of pairs of ribs arranged spirally thereon in a manner to move the stalks longitudinally relative to the axis of the roller, each of said pairs of ribs terminating in a bridge spanning the intervening channel and having the bridge of one pair arranged substantially diametrically opposite that of the adjacent pair.

7. A snapping-roller for corn-harvesters comprising, in combination, a body portion and a plurality of pairs of ribs in two series arranged spirally thereon in a manner to move the stalks longitudinally relative to the axis of the roller, each of said pairs of ribs terminating in a bridge spanning the intervening channel and having the bridge of one pair in one series arranged substantially diametrically opposite that of the adjacent pair in the other series, and the two series of bridges being substantially parallel with the axis of the roller.

8. A snapping-roller for corn-harvesters comprising, in combination, a body portion and a plurality of pairs of ribs in two series arranged spirally thereon in a manner to move the stalks longitudinally relative to the axis of the roller, each of said pairs of ribs terminating in a bridge spanning the intervening channel, the bridges of each pair in one series being arranged substantially diametrically opposite and intermediate those of the other series.

9. A snapping-roller for corn-harvesters comprising, in combination, a body portion and a series of pairs of ribs arranged spirally thereon in a manner to move the stalks longitudinally relative to the axis of the roller, each pair of said ribs terminating in a bridge spanning the intervening channel, said ribs gradually increasing in height as they approach said bridge.

10. A pair of coacting snapping-rollers for corn-harvesters adapted to be rotated in opposite directions and comprising, in combination, cylindrical body portions, each having a series of pairs of ribs arranged spirally thereon in a manner to move the stalks longitudinally in the same direction relative to the axis of said rollers, each pair of said ribs terminating in a bridge spanning the intervening channel.

11. A pair of coacting snapping-rollers for corn-harvesters adapted to be rotated in opposite directions and comprising, in combination, cylindrical body portions, each having a series of pairs of ribs arranged spirally thereon in a manner to move the stalks longitudinally in the same direction relative to the axes of said rollers, each pair of said ribs terminating in a bridge spanning the intervening channel, said bridges adapted to contact with the stalks and press them against the body portion of the coacting roller.

12. A pair of coacting snapping-rollers for corn-harvesters adapted to be rotated in opposite directions and comprising, in combination, cylindrical body portions, each roller having two separate series of pairs of spirally arranged ribs, the separate series being located upon opposite sides of the body portions of the rollers substantially parallel with the axis thereof, and each pair of ribs terminating in a bridge spanning the intervening channel.

13. A pair of coacting snapping-rollers for corn-harvesters adapted to be rotated in opposite directions and having cylindrical body portions, each roller having two separate series of pairs of spirally arranged ribs, the separate series being located upon opposite sides of the body portion of the rollers substantially parallel with the axis thereof, and each pair of ribs terminating in a bridge spanning the intervening channel, the bridge portions of the series upon one roller being opposed to the body portion of the coacting roller.

14. A pair of coacting snapping-rollers for corn-harvesters adapted to be rotated in opposite directions and having cylindrical body portions, each roller having two separate series of pairs of spirally arranged ribs, the separate series being located upon opposite sides of the body portion of the rollers substantially parallel with the axis thereof, and each pair of ribs terminating in a bridge spanning the intervening channel, the bridge portions of the separate series being substantially parallel with the axis of the roller and opposing the body portion of the coacting roller.

JOHN A. STONE.

Witnesses:
OTTO H. AHLERS,
OSCAR A. ANDERSON.